A. M. AUSTIN.
PROCESS AND APPARATUS FOR DRYING EDIBLE PASTES.
APPLICATION FILED MAY 5, 1910. RENEWED NOV. 11, 1916.
1,229,397.
Patented June 12, 1917.
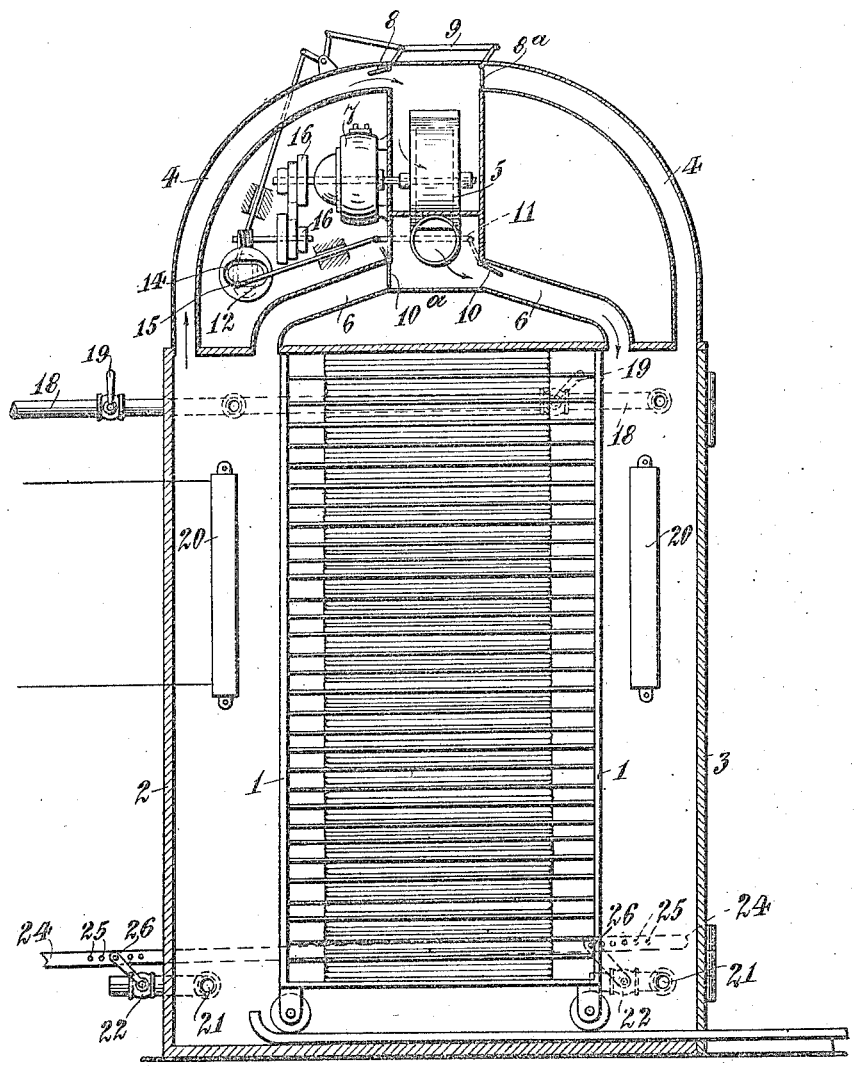

UNITED STATES PATENT OFFICE.

ALBERT M. AUSTIN, OF PIERMONT, NEW YORK.

PROCESS AND APPARATUS FOR DRYING EDIBLE PASTES.

1,229,397.

Specification of Letters Patent.      Patented June 12, 1917.

Application filed May 5, 1910, Serial No. 559,638.  Renewed November 11, 1916.  Serial No. 130,920.

*To all whom it may concern:*

Be it known that I, ALBERT M. AUSTIN, a citizen of the United States, residing at Piermont, in the county of Rockland and State of New York, have invented certain new and useful Improvements in Processes and Apparatus for Drying Edible Pastes, of which the following is a specification, reference being had to the accompanying drawings, forming a part hereof.

This invention relates particularly to the drying of macaronic food pastes, and especially to the drying of such products as macaroni, which are formed with central openings therethrough.

The principal object of the invention is to provide a process and apparatus whereby the drying of edible pastes, and particularly the drying of macaroni and products of similar shape and section may be performed rapidly and expeditiously, and whereby the color, flavor, consistency and other characteristics of such products when dried by the so-called natural system of drying, may be reproduced. The further objects of the invention will be more fully set forth in the following description of the preferred form of carrying out the invention.

The accompanying drawing shows an apparatus, partly in section, embodying the invention, and adapted for carrying out the process.

Heretofore many attempts have been made to dry edible pastes mechanically, so as to produce the color, taste, consistency and other characteristics of such food products when produced by the system which is commonly known as the "Neapolitan" system of drying, that is, by subjecting the product to natural atmospheric conditions. All attempts heretofore made to dry such products in a relatively short time, however, have been only partially successful, because of the great difficulties which arise in practice and the many elements involved in a successful process, such as making provision for inducing and arresting fermentation, preventing the product from becoming either too brittle or too soft, avoiding warping, bending or splitting, providing against molding or souring, etc.

According to my improved process the macaroni or similar product, after being cut to suitable lengths is subjected to a preliminary very rapid drying in the usual manner to prevent same from falling apart in handling. It is then placed in a suitable receptacle where the air contained in the interior of the several pieces or lengths of macaroni and which is saturated with moisture, is agitated, and gradually changed. This is accomplished by alternately forcing the air into and drawing it from each end of the macaroni tube or length. Meanwhile the body of air in the receptacle is gradually changed by slowly introducing fresh relatively dry air and permitting the moist air to escape from the receptacle. The air is changed slowly, since a rapid change of air is likely to produce bending, warping or splitting of the goods. During this step the temperature of the air is preferably maintained at a temperature determined by the normal atmospheric temperature in the drying room for example, at or about 70° F. to 74° F., so that comparatively little fermentation occurs.

After the drying has progressed to the stage where the greater part of the moisture has been removed, the final drying takes place in a constant or substantially constant body of air, the temperature of which is gradually raised to about 80° F. by any suitable means to shorten the time required for drying, and preferably to induce a slight amount of fermentation. During this step the air within the macaroni tubes is constantly agitated and changed so as to remove the moist air which would otherwise collect within the same. The moisture extracted comingles with the air in the receptacle and tends to keep the exterior of the goods sufficiently moist to prevent bending, and also tends to cause the drying to proceed approximately uniformly on the inside and the outside.

In the particular form of apparatus illustrated in the accompanying drawing the macaroni is placed in layers or bundles which may be separated from each other in any well-known manner upon a suitable conveyance, as the rack 1. The drying is carried on in a closed receptacle 2 provided with a door 3 for admitting and removing the rack. The interior of the receptacle is in communication through channels 4 with the suction of a fan 5 and in communication through channels 6 with the discharge of said fan. The fan may be driven by any suitable means as the motor 7. Valves 8 and 8ª are provided in the channels communicating with the suction of the fan and may be connected together so as to be operated simultaneously by any suitable means as the connecting rod 9, which is secured to the valves so that one of said valves is open when the other is closed. Valves 10 and 10ª are provided in the channels communicating with the discharge of the fan, and likewise may be connected by a connecting rod 11 secured to the valves so that when one is open the other is closed. The valves are operated preferably by a cam 12 having grooves 14 therein to receive the pins or rollers 15 connected with the valve. Said cam is preferably formed so that one set of valves, as for instance the valves 8 and 10 shall remain open for a slightly longer period than the other set of valves, 8ª and 10, whereby the current of air will be directed against one end of the macaroni tubes for a longer period than against the opposite end. The cam plate may be driven from the motor 7 by any suitable change speed gearing, as for instance the step pulleys 16, which will permit the rate of movement of the cam plate, and consequently of the valves, to be controlled.

Any well known means, as a pipe 18, controlled by a valve 19, provides means for supplying steam to the interior of the receptacle when desired. Suitable heating devices, as the resistance coils 20 are provided in the receptacle whereby the temperature of the air therein may be raised to the exact degree required.

In order to change the body of air in the receptacle by removing moist air and introducing fresh air, pipes 21 are connected with the receptacle, which are controlled by the valves 22. Preferably said valves are connected together and operable by a connecting rod 24 provided with means, as the holes 25 adapted to receive the pins 26 whereby the valves may be set in different relations to said rod to regulate the quantity of air removed or admitted. The rod may be reciprocated to open and close the valves, by any suitable means (not shown).

In employing this apparatus to carry out the improved process, the macaroni or other product is placed upon the racks and the motor 7 is set in operation, which actuates the fan and the valves in the channels 4 and 6. The valves are so arranged that when the valve 8 is open the valve 10 is also open, but the valves 8ª and 10 are closed; and when the valve 8ª is open the valve 10 is also open and the valves 8 and 10ª are closed. Consequently the air is simultaneously forced against and exhausted from the opposite ends of the goods, and the direction of the current is alternately changed from one side or end to the other as each set of valves is alternately opened and closed. In this manner the air within the interior of the macaroni tubes is constantly agitated and is slowly changed, not only by the well-known natural laws covering the interchange of gases, but because a reciprocating, but general advancing movement of the dry air, or fluid, through the macaroni tubes is produced as the current of air is directed against one end of the tubes for a longer period than against the other end. During this operation a portion of the moist air may be removed from the receptacle and fresh, relatively dry air may be introduced by operating the valves 22 in the pipes 21.

After the macaroni has become partially dried the operation of drying is preferably carried on in the same body of air which is alternately forced into and withdrawn from each end of the macaroni tubes. The moisture which is in the interior of the tubes is thus caused to comingle with the body of air and is absorbed in part by the exterior portion of the macaroni tubes, which tend to become dry more rapidly than the interior portion. During this stage of the operation the heating coils are preferably employed to raise the temperature of the body of air until the same is from 5 to 10° above the initial temperature, for example at 80° F. In case the exterior of the goods becomes too dry, for any reason, such as excessive drying in the first stage of the process, then steam or watery vapor may be admitted to correct this defect.

By means of this process and apparatus macaroni and similar products may be dried in a period of 8 to 20 hours, compared with a corresponding number of days required by the so-called natural method. The goods produced by the process possess all of the desirable characteristics of goods produced by the natural method, and in many respects are superior thereto, since the drying is more uniform and defects may be more quickly discovered and readily remedied. The goods themselves, with the racks upon which they are placed, constitute partitions which practically divide the receptacle into two separate compartments. The apparatus provides means for controlling absolutely the degree of fermentation which imparts the particular flavor and taste to the macaroni produced, under the best conditions, by the natural method, since the fermentation can be produced and arrested as desired. It is obvious that various changes, within the skill of the mechanic may be made in the apparatus herein shown and that equivalent steps may be substituted in the process without departing from the invention, provided the means and processes set forth in the following claims be employed.

I claim as my invention:

1. In a drying apparatus the combination with a receptacle containing the goods to be dried, of a rotating fan having its suction and discharge communicating with the interior of said receptacle, and means operated with the fan for directing the discharge of said fan against different portions of the goods alternately and for different periods of time, said means including a device for controlling the period during which the current is directed against each end of the goods.

2. In the art of drying open ended tubular edible paste, the process which consists in constantly circulating a body of drying air about the tubes of paste, said air being alternately forced into and drawn from each end of the tubes, the forcing of the air into one end of the tubes taking place substantially simultaneously with the drawing of the air from the opposite end of the tubes, the air being directed against one end of the tubes for a longer period of time than against the opposite end whereby the air is progressively advanced through the tubes.

3. In a drying apparatus, the combination with a receptacle substantially divided into two compartments by the goods to be dried, of an air-circulating device having an intake and an exhaust, a pair of conduits leading from said intake, one conduit to each of said compartments and a pair of conduits leading from said exhaust, one to each of said compartments, a valve in each of said conduits and a means coupled with said valves for simultaneously opening one compartment to the exhaust while opening the other compartment to the intake and closing the first mentioned compartment to the intake while closing said other compartment to the exhaust.

4. In a drying apparatus, the combination with a receptacle substantially divided into two compartments by the goods to be dried, of a fan, a pair of conduits leading from the discharge of the fan, one conduit to each of said compartments and a second pair of conduits leading to the suction of the fan, one conduit from each of said compartments, a valve for each of said conduits, a cam, means connecting said cam with each of said valves for simultaneously opening one compartment to the suction while opening the other compartment to the discharge of the fan and closing the first mentioned compartment to the discharge of the fan, while closing said other compartment to the suction of the fan and a driving means coupled with said cam and said fan.

This specification signed and witnessed this 3rd day of May, A. D., 1910.

ALBERT M. AUSTIN.

Signed in the presence of—
N. A. SMITH,
AMBROSE L. O'SHEA.